UNITED STATES PATENT OFFICE.

THOMAS B. CROWE, OF COLORADO SPRINGS, COLORADO.

METHOD OF TREATING ORES CONTAINING TELLURIDS OF GOLD.

987,964. Specification of Letters Patent. Patented Mar. 28, 1911.

No Drawing. Application filed October 12, 1908. Serial No. 457,314.

*To all whom it may concern:*

Be it known that I, THOMAS B. CROWE, a citizen of the United States of America, and resident of Colorado Springs, El Paso county, Colorado, have invented a certain new and useful Improvement in Methods of Treating Ores Containing Tellurids of Gold, of which the following is a specification.

It has been discovered that an alkaline hypochlorite is a solvent for tellurium. It has also been discovered that an alkaline persulfate is a solvent for tellurium. In the practical and commercial application of this discovery or these discoveries to the treatment of ores containing tellurids of gold, considerations of economy become exceedingly important. To recover the values of low grade ores, it is essential that the process employed should be of such low cost as to permit the commercial extraction of those values.

It has been my object, therefore, in the practical application of the discovery or discoveries aforesaid to the extraction of tellurium from the tellurids of gold contained in the ore, as well as in the practical application of the simultaneous dissolution of the tellurium and gold to discover and evolve processes by means of which these results may be accomplished at a sufficiently low cost, whereby to extract the values from low grade ores. As the processes which I have discovered contemplate the employment of chemicals, entirely eliminating roasting, it is essential that the quantity of chemicals per ton of ore treated must be reduced to a minimum, and also that means should be resorted to for the recovery so far as possible of such chemicals after they have performed their service. In the chemical reactions the processes employed tend to destroy or consume some or all of the chemicals employed, such means should be employed as will tend to preserve intact the integrity of the chemicals so that they may perform to their fullest extent the desired functions. To this end, therefore, after repeated experiments upon the tellurid ores of the Cripple Creek district, I have discovered that to practically and commercially employ the discovery of the alkaline hypochlorite as a solvent for tellurium in tellurids of gold contained in precious metal bearing ores, it is essential to first so treat these ores as to withdraw or extract therefrom to the greatest possible extent those elements contained therein which are known as reducing agents, such as the sulfids of iron, lead, zinc or copper, which tend to consume or destroy the alkaline hypochlorite, thus weakening or entirely destroying the efficiency of the alkaline hypochlorite solution in the dissolution of the tellurium in the tellurids of gold. To accomplish this result, I have discovered that it is essential to preliminarily treat the ores bearing the tellurids of gold and the reducing agents by subjecting the ores to concentration after the well known methods employed, except that such concentration as employed by me is directed to and has for its object the separation and withdrawal of the reducing agents, while in the ordinary method of concentration it is the object and aim to separate and withdraw the gold or other precious metals. So that in the application of this discovery to the preliminary treatment of ore for the purpose of subjecting it to the treatment of an alkaline hypochlorite solution to dissolve the tellurium in the tellurids of gold it should be endeavored to so concentrate as to eliminate and withdraw the reducing agents thus to preliminarily prepare the ore so that the alkaline hypo-chlorite solution should not be weakened or consumed by such reducing agents. In the prosecution of my experiments with the end in view of employing this discovery that an alkaline hypo-chlorite is a solvent for tellurium to the dissolution of tellurium in the tellurids of gold, I have discovered that it is essential to have resort to means which will prevent the total or appreciable transformation of the alkaline hypo-chlorite into an alkaline earth hypochlorite, such as calcium hypochlorite, for this, of course, would result in very essentially weakening the function of the alkaline hypochlorite or destroying its efficiency entirely as such a solvent.

In usual practice, it is the custom to add to the ore to be treated a quantity of calcium hydroxid, such as lime, to counteract or neutralize the natural acidity of the ores, and if in this process such a quantity of lime were added as would more than substantially neutralize the acidity or proceed too far beyond the mere neutralization of such acidity, it would then result in the transformation, either wholly or to an appreciable extent, of the alkaline hypochlorite into a calcium hypochlorite, thus materially weakening its efficiency or destroying it altogether as a solvent for tellurium in the tellurids of gold. To this end my discovery consists, therefore, as a process in the treatment of ores bearing tellurids of gold with an alkaline hypochlorite, by subjecting such ores preliminarily to concentration to extract the reducing agents and then treating the residuum with a calcium hydroxid such as lime, and an alkaline hypochlorite, the lime being added in such a quantity only as will render the solution substantially neutral with respect to acidity, and without such a predominance of the calcium hydroxid as will weaken or destroy the alkaline hypochlorite solution.

As economy is the essence of the practicability of such processes as employ means for dissolving the tellurium in the tellurids of gold, it is desirable and perhaps essential to recover the chemicals so far as possible which are employed in the process, and as in the event where an alkaline hypochlorite is employed as a solvent for the tellurium of the tellurids of gold a comparatively large quantity of sodium chlorid—which is the preferred material—must be used, it is extremely desirable to recover the sodium chlorid at the proper stage of the operation and at the least possible loss. To this end, my discovery consists in treating the ore containing tellurids of gold with a solution of alkaline hypochlorite and calcium hydroxid in the manner previously described, after preliminary concentration to dissolve the tellurium of the tellurids of gold, and then, instead of subjecting the residue after such treatment to a bath of water to remove or wash out the hypochlorite, such as sodium hypochlorite, I retain the sodium hypochlorite in contact with the ore for a sufficient time to cause the transformation of the sodium hypochlorite into a sodium chlorid. In the subsequent treatment of the ore residuum containing the sodium chlorid by a preferaby weak cyanid solution, the sodium chlorid is recovered from the ore residuum by the displacement of the salt-bearing solution in the ore residuum with a cyanid solution. Thus one step in the operation is entirely eliminated,—viz., that of washing—so that the solution remaining may at any time subsequently be treated to transform it into a sodium hypochlorite. It has also been discovered that an alkaline persulfate solution may be employed in combination with a cyanid solution to simultaneously dissolve the tellurium and the gold in ores containing tellurids of gold. I have found that it is necessary to accomplish the desired result to employ large quantities of the cyanid and the alkaline persulfate; so large, in fact, as to be economically prohibitive. The prosecution of experiments in an effort to practically and commercially employ these discovered processes has led to the discovery by me of a chemical compound which is economically efficient and will accomplish the desired results, provided the ores are treated in a proper manner to neutralize their natural acidity. I have discovered that cyanogen iodid, a compound which may be produced by a solution of alkaline cyanids and soluble iodid and a soluble persulfate, is more efficient and economical in the dissolution of the tellurium and the simultaneous dissolution of the gold in ores bearing tellurids of gold. In applying this process, I have found it essential to depart from the usual method employed of counteracting or neutralizing the natural acidity of the ores by the applicaiton of an alkali, and do this by applying to the ores such a quantity of an alkali only as will bring about a neutral condition—that is, one in which the ores are neither strongly alkaline or strongly acid. That is, I have discovered that it is essential in the prosecution of this process to approximate, as closely as possible, to the neutral condition. Of course, in practice it is not possible to always produce a condition in which the ore is neither alkaline nor acid, but it is important that the ore should not contain such a quantity of acid as will materially consume the alkaline cyanid, nor should it contain such a predominance of alkali as will materially consume the cyanogen iodid.

In the ordinary practice of the cyanid process, it is not essential that the neutral point of neither acidity nor alkalinity should be approximated, since it is necessary only to counteract the natural acidity of the ores which tends to consume the cyanid. A practice of this process, consisting in the treatment of the ores containing tellurids of gold with a solution of cyanogen iodid, which solution is approximately neutral with respect to acidity and alkalinity, has demonstrated that an exceedingly weak solution of cyanogen iodid may be employed well within economical limits, and which is more efficient in the simultaneous dissolution of the tellurium and the gold in the tellurids of gold, than when merely a solution of cyanid and persulfate is employed.

It will be observed that in the process of alkaline cyanid and alkaline persulfate treatment in the dissolution of the tellurids of gold, they each perform their individual function, the alkaline persulfate acting to dissolve the tellurium, while the alkaline cyanid acts to dissolve the gold. Whereas my discovery consists in obtaining one compound, namely cyanogen iodid which itself performs the function of both dissolving the tellurium and the gold of the tellurids of gold. I have described one way of obtaining this cyanogen iodid, but it will be evident that there are other ways which may be employed to obtain it, thus by passing elementary iodin through a solution of alkaline cyanid. The importance of so treating the ore with an alkaline solution which approximates the neutral condition is peculiar to the process which I have discovered, since it is not necessary to so approximate the neutral condition in the case where the process employed consists merely of an alkaline cyanid solution with an alkaline persulfate solution.

Having thus described my invention, what I claim as new therein and desire to secure by Letters Patent is:

1. The process of treating ores containing tellurids of gold which consists in preliminarily subjecting the same to concentration for the purpose of removing reducing agents, and then subjecting the same to the application of a solution of alkaline hypochlorite.

2. The process of treating ores containing tellurids of gold, which consists in subjecting the same to the application of an alkaline hypochlorite solution, retaining said solution in contact with the ore for a sufficient length of time to convert the alkaline hypochlorite into alkaline chlorid, and then treating the same with an alkaline cyanid solution to displace the salt bearing solution in the ore residuum with a cyanid solution.

3. The treatment of ores containing tellurids of gold, which consists in applying an alkaline hypochlorite solution and an earth alakli in such sufficient quantities as will neutralize the acidity of the ore without transforming the alkaline hypochlorite into an alkaline earth hypochlorite.

Signed by me at Chicago, Illinois this 26th day of Sept. 1908.

THOS. B. CROWE.

Witnesses:
F. H. DRURY,
E. CLEGG.

Copies of this patent may be obtained for five cents each, by addressing the "Commissioner of Patents, Washington, D. C."